(12) United States Patent
Kraft et al.

(10) Patent No.: US 6,189,293 B1
(45) Date of Patent: *Feb. 20, 2001

(54) CONTAINER FILLING MACHINE

(75) Inventors: Eberhard Kraft, Neckarbischofsheim (DE); Hans-Peter Wild, Zug (CH)

(73) Assignee: INDAG Gesellschaft fur Industriebedarf m.b.H. (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 36 days.

(21) Appl. No.: 09/163,754

(22) Filed: Sep. 30, 1998

(30) Foreign Application Priority Data

Oct. 16, 1997 (DE) .............................. 197 45 852

(51) Int. Cl.[7] .............................. B65B 1/00; B65B 43/52; B65B 63/08

(52) U.S. Cl. .............................. 53/440; 53/569; 53/127; 53/570; 53/284.7; 198/462.3

(58) Field of Search .............................. 53/570, 127, 440, 53/459, 469, 284.7; 198/462.1, 462.3

(56) References Cited

U.S. PATENT DOCUMENTS

| | | | | |
|---|---|---|---|---|
| 1,932,683 | * | 10/1933 | Beeson | 198/432.3 |
| 3,340,679 | * | 9/1967 | Johnson | 53/570 |
| 3,382,644 | | 5/1968 | Vogt . | |
| 3,494,482 | | 2/1970 | Lense . | |
| 3,855,907 | * | 12/1974 | Johnson et al. | 53/469 |
| 3,941,233 | | 3/1976 | Aiuola et al. . | |
| 3,961,569 | | 6/1976 | Kenyon et al. . | |
| 4,473,989 | | 10/1984 | Tsutsumi et al. . | |
| 4,696,146 | * | 9/1987 | Esch | 53/570 |
| 5,197,586 | * | 3/1993 | Sala | 198/462.3 |
| 5,423,414 | | 6/1995 | Vaughn et al. . | |

FOREIGN PATENT DOCUMENTS

| | | |
|---|---|---|
| 2642490B2 | 7/1977 | (DE) . |
| 4329179A1 | 3/1995 | (DE) . |
| 0073867A1 | 3/1983 | (EP) . |
| 0371474A1 | 6/1990 | (EP) . |
| 0711719A1 | 5/1996 | (EP) . |
| 2297955 | 8/1996 | (GB) . |
| 161344 | 6/1973 | (HU) . |
| 59-62421 | 4/1984 | (JP) . |

* cited by examiner

Primary Examiner—John Sipos
(74) Attorney, Agent, or Firm—Tilton, Fallon, Lungmus & Chestnut

(57) ABSTRACT

A filling machine for sheet bags comprising a transportation means including a plurality of transportation elements for the sheet bags, for supplying the sheet bags to an opening station, a filling station, a closing station and a cooling station. The transportation means comprises a first conveying means including a plurality of first transportation elements for feeding sheet bags to the opening station, the filling station and the closing station, and a second conveying means including a plurality of second transportation elements for feeding the sheet bags to the cooling station. A transfer station is provided for transferring the sheet bags from the first conveying means to the second conveying means. In a method for opening, filling, closing and cooling sheet bags, the sheet bags are supplied to the opening station, the filling station and the closing station at a first speed and at a first spacing in the conveying direction and to a cooling station at a second speed and at a second spacing, the first spacing being greater than the second spacing and the first speed greater than the second speed.

6 Claims, 2 Drawing Sheets

CONTAINER FILLING MACHINE

FIELD OF THE INVENTION

The present invention relates to a filling machine for flexible sheet bags comprising a transportation means including a plurality of transportation elements for sheet bags, for supplying the sheet bags to an opening station, a filling station, a closing station and a cooling station, and to a method for opening, filling, closing and cooling sheet bags.

BACKGROUND OF THE INVENTION

To subject flexible sheet bags to a plurality of treatment steps, such as forming a bag opening, filling with filling material, sealing or closing and cooling, it is known that the sheet bags are guided past corresponding treatment stations with the aid of transportation elements.

SUMMARY OF THE INVENTION

Especially in their unfilled state, the sheet bags are not very stiff and must therefore be kept in a suitable position. To this end, the transportation elements must comprise corresponding holding devices. Moreover, the sheet bags must be opened in the corresponding treatment station to be filled with filling material and to be subsequently closed again. To this end, the transportation elements must comprise corresponding molding parts. To be able to fulfill all of the above-mentioned tasks, known transportation elements therefore require more or less complicated constructional members having corresponding dimensions.

In a so-called in-line indexing machine, a plurality of bags are simultaneously treated in rows extending in a direction transverse to the transportation direction. To this end, there is provided a transportation means which intermittently guides the sheet bags in corresponding transportation elements past the treatment stations. During operation, a plurality of sheet bags are each positioned on the transportation means in one row in a direction transverse to the motional direction and side by side. Such a row is always subjected to a specific treatment step at the same time. The row of sheet bags which is the succeeding one in motional direction is subjected to a preceding treatment step. The distance between the individual transportation elements on the conveying means is thus adapted to the distance of the individual treatment stations on the one hand and to the dimensions of the transportation elements on the other hand.

In a known filling machine, the transportation elements together with the sheet bags positioned therein are guided by a transportation means first underneath an opening station, a filling station and a closing station. In the further course, the sheet bags are supplied to a cooling station for cooling the sheet bags after they have been filled, e.g., with a hot filling material.

To be sufficiently cooled, the sheet bags must stay in the cooling station for a sufficiently long period of time. To this end, the transportation means must be operated either at a sufficiently slow pace or discontinuously, which results in an undesired decrease in the overall throughput. When the sheet bags are supplied to the cooling station in the transportation elements, a great number of such transportation elements are required. Since these transportation elements, as described, have a complicated structure with corresponding molding parts, such a container filling machine is expensive.

It is the object of the present invention to provide a filling machine for flexible sheet bags which in spite of its high performance is simple and thus inexpensive, particularly with respect to manufacture.

This object is achieved in a generic filling machine for sheet bags with the features of the characterizing part of claim 1 and in a method with the features of claim 9.

Advantageous developments are the subject matter of the subclaims.

In a filling machine of the invention, the transportation means comprises a first conveying means including a plurality of first transportation elements for supplying sheet bags to the opening station, the filling station and the closing station, and a second conveying means including a plurality of second transportation elements for supplying the sheet bags to the cooling station, and a transfer station for transferring the sheet bags from the first conveying means to the second conveying means.

It is possible with the aid of two independent conveying means to individually adjust the speed or rate at which the sheet bags are guided past the corresponding treatment stations and cooling station, respectively. A faster indexing rate which is e.g. possible in the opening, filling and closing stations does not necessarily entail a fast indexing rate or a high speed when the sheet bags pass through the cooling station. Moreover, the second transportation elements of the second conveying means may be of a simpler construction because opening or closing functions need no longer be performed in the cooling station. The sheet bags are already filled in the cooling station so that they also have a sufficient inherent stability, and expensive holding devices need not be provided in the transportation elements. It is thereby possible to give the second transportation elements, which feed the sheet bags to the cooling station, a simpler design, so that the number of the necessary transportation elements with a complicated structure can be reduced considerably.

Advantageously, the second conveying means is operated at a lower speed than the first conveying means. A lower speed of the second conveying means a longer dwell time of the sheet bags in the area of the cooling station, which enhances cooling efficiency.

In a further advantageous development, the second transportation elements of the second conveying means are spaced apart from one another at a smaller distance in the conveying direction than the first transportation elements in the first conveying means. When the second conveying means is operated at a lower speed than the first conveying means, it can be guaranteed through a reduced spacing that the sheet bags that are supplied at a faster rate by the first conveying means are transported away by the second conveying means despite the reduced speed. In this way it is possible to operate the machine with a very high output, with the latter being essentially defined by the indexing rate of the first conveying means. The cooling area will then be devoid of any throughput-reducing portions.

In an advantageous development, the operative height of the opening station, the filling station and the closing station is adjustable to adapt the apparatus to sheet bags having different heights.

In a particularly advantageous embodiment, the filling machine comprises a platform in the transition area between the first and second conveying means. Such a platform permits easy maintenance and monitoring of the individual treatment stations or operations.

In one embodiment, the transfer station comprises vertically adjustable and laterally displaceable elements which hold clamps with the aid of which the sheet bags are conveyed from the first conveying means to the second conveying means. Advantageously, an automatic control is provided for this purpose.

BRIEF DESCRIPTION OF THE DRAWINGS

An embodiment of an inventive filling machine and the function thereof shall now be described with reference to the figures, in which.

DETAILED DESCRIPTION OF THE PREFERRED EMBODIMENT

Figure 1:
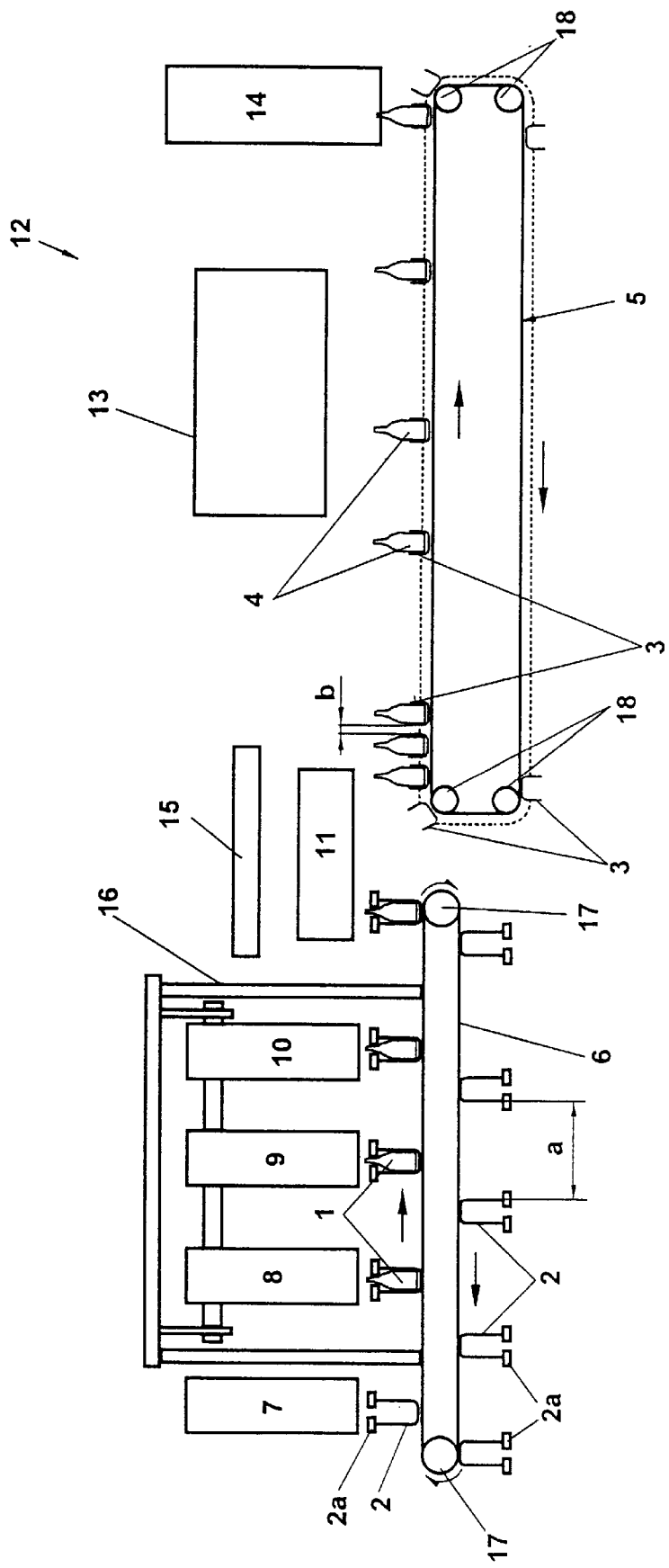
FIG. 1 is a schematic side view of an inventive filling machine.

The illustrated embodiment comprises a bag magazine 7, an opening station 8, a filling station 9 and a closing station 10 which are arranged above the first conveying means 6. The conveying means 6 serves to supply rows of sheet bags 1 to said treatment stations. Since FIG. 1 is a lateral view, it is only possible to see the first sheet bag of a row. The individual treatment stations extend each across the whole row of sheet bags.

The sheet bags 1, which are per se known, consist e.g. of laminated aluminum foil. Two sheets or foils are sealed together at three sides while a bottom part is used at the fourth side. The sheet bag is thereby enlarged downwards to form a standing surface. In the unfilled state, the upper edge of the bag 1 is still unsealed.

Transportation elements 2 are positioned on the conveying means 6 at a distance a from one another in the conveying direction. The individual transportation elements comprise molded parts 2a which are per se known and which serve to hold the sheet bags in an upright position and to support the opening and closing operations. The conveying means 6 comprising the transportation elements 2 run around deflection rollers 17, thereby forming an endless belt.

The opening station 8, the filling station 9 and the closing station 10 are secured to a frame 16 which is vertically adjustable. The closing station 10 is followed by a transfer station 11 which passes the closed sheet bags to a second conveying means 5. This second conveying means 5 passes through a cooling station 12 which is e.g. formed by a ventilation type cooling means. However, there may also be provided other cooling mechanisms, for instance corresponding cooling zones or a water type cooling means 13. FIG. 1 is a schematic view showing e.g. a ventilation type cooling means 13.

The second conveying means 5 has attached thereto transportation elements 3 which are spaced apart from one another in the conveying direction at a distance b which is smaller than the distance a of the transportation elements 2 on the first conveying means 6. The second conveying means 5 is an endless belt which is returned around the deflection rollers 18. The cooling station 12 is followed by a removal device 14.

Both the first and the second transportation elements (2, 3) are arranged in rows side by side, of which the lateral view of FIG. 1 only shows the respectively first element. The sheet bags which are guided in such a row of transportation elements side by side through the treatment stations are subjected to the respective treatment stations at the same time. For the sake of simplicity the figures do not show all of the transportation elements which are supplied one after the other to the treatment stations. Transportation elements that are not shown are e.g. marked by a broken line in the second conveying means.

In the transfer region between the first and second conveying means, a maintenance and monitoring platform 15 is positioned above the transfer device 11.

The motional directions of both the first conveying means 6 and the second conveying means 5 are indicated by arrows.

Figure 2:
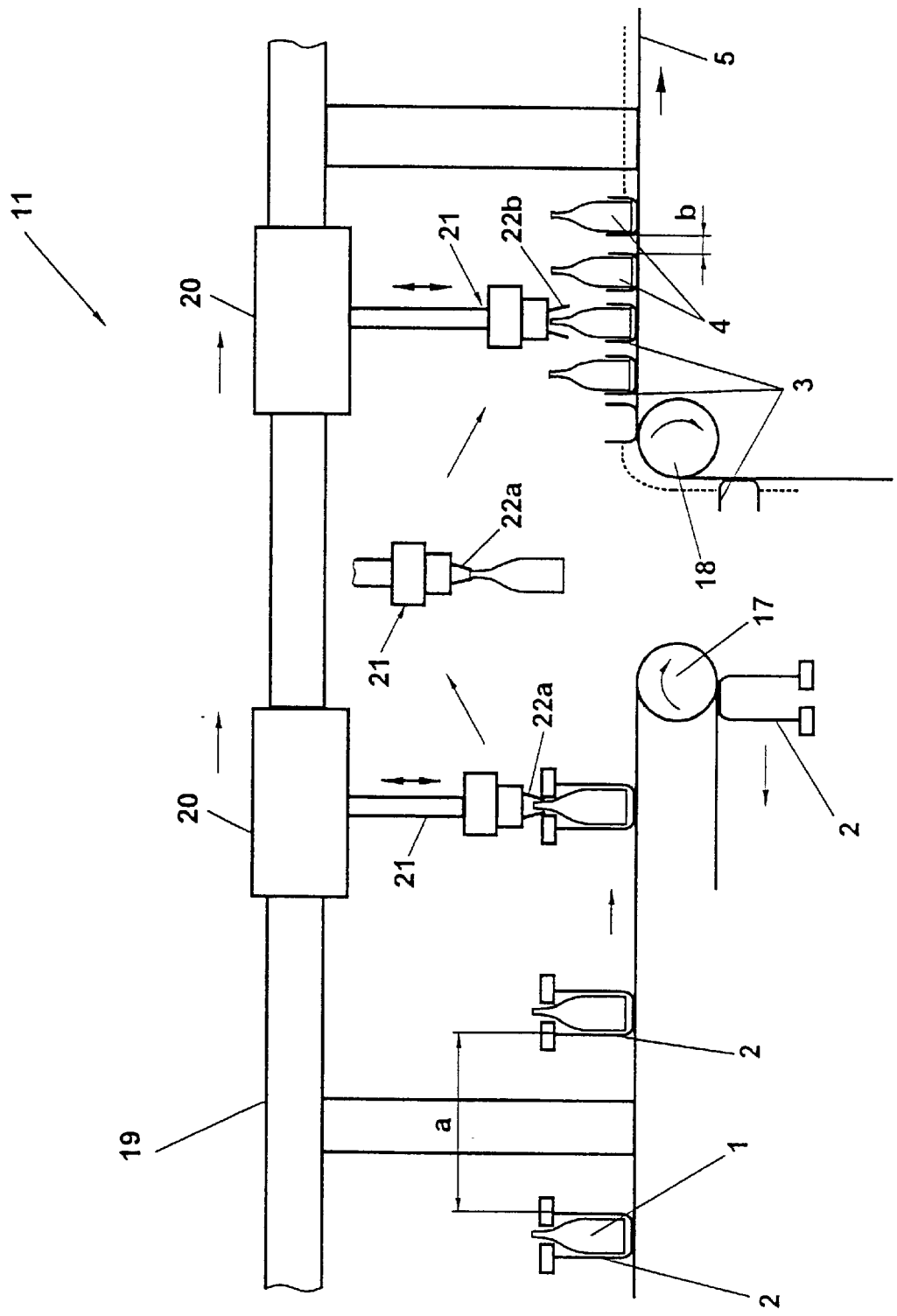
FIG. 2 is a schematic side view showing the transfer region of an inventive filling machine.

FIG. 2 is a schematic view illustrating a detailed section of FIG. 1 with the transfer station 11.

Horizontally movable carrier elements 20 are postioned on a carrier 19. These carrier elements 20 have secured thereto vertically adjustable elements 21, the lower ends of which are followed by clamps 22a, 22b which serve to receive the sheet bags 1, 4. These vertically adjustable elements 21 are e.g. pneumatic cylinders or rotatable spindles having correspondingly threaded counterparts. Other configurations are also possible. The further elements correspond to the elements described with reference to FIG. 1 and are designated by the same reference numerals. The movement of the individual elements and of the sheet bags in the transition region is also represented by arrows.

The mode of operation of the described embodiment will now be explained. The operation is described with reference to a sheet bag of one row which passes through the treatment stations.

An empty sheet bag is taken by a transportation element 2 from the magazine 7 through a mechanism (not shown in more detail), for instance a suction device. In the illustrated embodiment, the sheet bag is guided in an upright position in a transportation element. It is held in its upright position by the elements 2a. A sheet bag is guided to the opening station 8 through the indexed movement of the conveying means 6. In this opening station 8, the sheet bag is inflated with the help of a small introduced tube. To be able to introduce the blow tube, the sheet bag must be slightly opened at its upper edge. This opening operation is e.g. carried out with a suction device (not shown in FIG. 1) which laterally engages the upper edge of the sheet bag, thereby moving the same apart. The sheet bag which is thereby inflated is further conveyed to the filling station 9. Hot material, e.g. beverage, is normally filled in at this station. One step later, the sheet bag filled in this manner is positioned below the closing station 10. To be able to seal the upper edge of the sheet bag in the closing station, the upper edges of the lateral surface must again be moved towards each other. This movement can e.g. be effected by releasing the suction devices which ensure that the sheet bags are opened in the opening station 8. The opening station, the filling station and also the closing station can be adapted with respect to their height to different bags. An adjustable frame 16 is provided for this purpose. After having been closed in the closing station 10, the sheet bags are moved by the transfer device 11 from the first conveying means 6 to the second conveying means 5. The transportation elements 2 of the first conveying means are returned with the help of the deflection rollers 17 for receiving a new sheet bag from the magazine 7.

FIG. 2 shows how the transfer device is designed in this embodiment. The whole transfer device 11 including the drives of the clamps 22a, 22b, the vertically adjustable elements 21 and the carrier elements 20, is controlled by a process computer. The sheet bags 1 are fed by the first conveying means 6 in the carrier elements 2 to the transfer device 11. At this place clamps 22a engage the sheet bags 1 in the upper portion. Vertically adjustable elements 21 move the sheet bags upwards while at the same time a horizontal movement of the carrier elements 20 is started on the carrier rail 19. Both the vertical movement of the vertically adjustable elements 21 and the horizontal movement of the carrier elements 20 are caused by drives which are controlled by the automatic control unit of the transfer device 11. To this end, there are provided drive means (not explicitly shown in FIG. 2), e.g. pneumatic cylinders or spindle gears, which function in a manner which is known per se.

Like in the other treatment stations, rows of sheet bags are simultaneously treated in the transfer device. The sheet bags are moved into the area of the second conveying means 5 through the horizontal movement of the carrier element 20 of the rail 19. The bags are there deposited in the transportation elements 3 of the second conveying means 2 by lowering the vertically adjustable elements 21. The clamps 22b are opened, thereby releasing the sheet bags into the transportation elements 3 of the second conveying means 5.

The second conveying means 5 moves the filled sheet bags 5 to a ventilation type cooling station 13. The speed of the second conveying means 5 is lower than the speed of the first conveying means 6. To be able to maintain the rate of the first conveying means 6 at the second conveying means 5, the distance b between the individual transportation elements 3 on the second conveying means 5 is smaller in the conveying direction than the distance a of the individual transportation elements 2 on the first conveying means 6. The reduced speed of the second conveying means 5 can thereby be compensated. Since the sheet bags 5 on the second conveying means 5 are already in their filled state and are thus sufficiently stable, no troublesome supporting measures have to be taken for keeping the bags in a vertical position. Consequently, the second transportation elements 3 on the second conveying means 5 can have a less complicated structure requiring less space than the first transportation elements 2 on the first conveying means 6. As shown in FIG. 2, the transportation elements 3 of the second conveying means 5 can be simple trough-shaped elements.

FIG. 1, in turn, shows how the second conveying means 5 guides the rows of sheet bags 4 through the cooling station 12. On account of the reduced speed of the second conveying means 5, the sheet bags 4 are positioned in the cooled area for a sufficiently long period of time, though the cooling station 12 on the whole is made shorter than the cooling stations in prior-art filling machines.

Finally, at the end of the cooling station 12, the rows of sheet bags are removed by a removal station 14 from the second conveying means 5 in a manner which is here of no further interest, for further transporation or packaging purposes.

The filling machine of the invention which includes two separate conveying means 5, 6 permits an individual control of the speed at which the sheet bags are supplied to the individual treatment stations and the cooling station, respectively. For example, a lower speed can thereby be achieved in the area of the cooling station without the rapid indexing rate in the area of the opening, filling or closing stations having to be dispensed with. Since a separate conveying means is provided for the cooling step and since conveying elements of a considerably simpler design suffice for the separate conveying means, the number of complicated transportation elements which are needed in the machine is reduced on the whole because complicated elements are only required in the area of the first conveying means for the stations passed through.

On the whole, the machine can thus be produced at considerably reduced costs but nevertheless shows a comparable output and, in the final analysis, the machine also requires less maintenance work than known machines.

We claim:

1. A filling machine for flexible sheet bags, and having a transportation means including a plurality of transportation elements for the sheet bags, a closing station and a cooling station, the improvement comprising:

an opening station in combination with said filling machine;

a filling station in combination with said filling machine;

a closing station in combination with said filling machine;

a cooling station;

the transportation means comprises a first conveying means (6) including a plurality of first transportation elements (2) for feeding the sheet bags (1) to the opening station (8), the filling station (9) and the closing station (10), said first transportation elements comprising holding elements which hold the sheet bags in an upright position and support opening and closing operations;

a second conveying means (5) including a plurality of second transportation elements (3) for feeding the sheet bags (4) to the cooling station (12), said second conveying means being operated at a lower speed than said first conveying means, and said second transportation elements (3) of said second conveying means (5) being spaced apart from one another at a smaller spacing (b) in the conveying direction than said first transportation elements (2) of said first conveying means (6), said second transportation elements being simple trough-like receiving elements; and a transfer station (9) is provided for transferring the sheet bags (1, 4) from said first conveying means (6) to said second conveying means (5).

2. The filling machine according to claim 1 wherein the height of each of said opening station (8), said filling station (9) and said closing station (10) is variable.

3. The filling machine according to claim 1, and a platform (15) in the transfer area from said first conveying means (6) to said second conveying means (5).

4. The filling machine according to claim 1, wherein said transfer station (11) comprises vertically adjustable and laterally displaceable elements (21) which hold respective clamps (22a, 22b) with the aid of which the sheet bags (1, 4) can be conveyed from said first conveying means (6) to said second conveying means (5).

5. The filling machine according to claim 4, and an automatic control unit for said adjustable and displaceable elements of said transfer station (11).

6. A method for opening, filling, closing, and cooling sheet bags, comprising the steps of supplying the sheet bags (1, 5) in first transportation elements to an opening station (8), a filling station (9), and a closing station (10) at a first speed and at a first spacing (a) in a conveying direction, wherein said bags are held by said first transportation elements in an upright position and are supported during the opening and closing operations, and supplying the sheet bags (1, 4) to a cooling station at a second speed and a second spacing (b) in second trough-like transportation elements in the conveying direction, said first spacing (a) being greater than said second spacing (b) in the conveying direction, and the second speed being lower than said first speed.

* * * * *